US010979253B2

(12) United States Patent
Zhou et al.

(10) Patent No.: US 10,979,253 B2
(45) Date of Patent: Apr. 13, 2021

(54) METHOD FOR CONTROLLING GAIN OF MULTI-STAGE EQUALIZER OF SERIAL DATA RECEIVER

(71) Applicant: Amlogic (Shanghai) Co., Ltd., Shanghai (CN)

(72) Inventors: Weihua Zhou, Shanghai (CN); Ming Shi, Shanghai (CN)

(73) Assignee: Amlogic (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 16/751,854

(22) Filed: Jan. 24, 2020

(65) Prior Publication Data

US 2020/0244491 A1 Jul. 30, 2020

(30) Foreign Application Priority Data

Jan. 25, 2019 (CN) .......................... 201910075743.8

(51) Int. Cl.
*H04L 25/03* (2006.01)

(52) U.S. Cl.
CPC .. *H04L 25/03031* (2013.01); *H04L 25/03178* (2013.01); *H04L 25/03343* (2013.01); *H04L 25/03885* (2013.01)

(58) Field of Classification Search
CPC ............................................... H04L 25/03031
USPC ........................................................ 375/232
See application file for complete search history.

(56) References Cited

U.S. PATENT DOCUMENTS

| 4,674,103 A * | 6/1987 | Chevillat | ............... H04L 27/066 375/222 |
| 10,250,417 B1 * | 4/2019 | Sun | .................... H04L 25/03885 |
| 2007/0109067 A1 * | 5/2007 | O'Sullivan | .......... H03C 3/0933 332/127 |
| 2014/0269975 A1 * | 9/2014 | Chong | .................. H04L 25/028 375/295 |

FOREIGN PATENT DOCUMENTS

| CN | 102098248 A | 6/2011 |
| CN | 106656876 A | 5/2017 |

* cited by examiner

*Primary Examiner* — Lihong Yu
(74) *Attorney, Agent, or Firm* — TraskBritt

(57) ABSTRACT

The invention comprises a method for controlling a gain of a multi-stage equalizer of a serial data receiver, applied to the serial data receiver comprising the multi-stage equalizer, wherein the method comprises: Step S1, enabling the serial data receiver to receive a set of serial data; Step S2, selecting a plurality of continuous data sequences from the set of serial data according to a preset first rule; Step S3, extracting a predetermined bit from each of the plurality of continuous data sequences; Step S4, calculating an equalization gain identifier corresponding to each of the plurality of continuous data sequences according to a predetermined bit in each of the plurality of continuous data sequences; Step S5, obtaining an optimized equalization gain identifier through calculation according to each of the equalization gain identifiers; and Step S6, controlling a gain value of the multi-stage equalizer according to the optimized equalization gain identifier.

9 Claims, 3 Drawing Sheets

METHOD FOR CONTROLLING GAIN OF MULTI-STAGE EQUALIZER OF SERIAL DATA RECEIVER

CROSS-REFERENCE TO RELATED APPLICATION

The present application claims priority to and the benefit of Chinese Patent Application No. CN 201910075743.8 filed on Jan. 25, 2019, the disclosure of which is hereby incorporated herein in its entirety by this reference.

TECHNICAL FIELD

The invention relates to the technical field of high-speed serial data receiver, and more particularly, to a method for controlling a gain of a multi-stage equalizer of a serial data receiver.

BACKGROUND

The development of science and technology, along with the social progress, allows people to have higher requirements for a high-speed data transmission and a more accurate data transmission. And since serial data is one of the most commonly used methods for transmission of high-speed signals, the design of the serial data receiver becomes ever more important.

Since signals are located in a complex and changeable environment, the signals may be easily attenuated. Therefore, the gain of the multi-stage equalizer is controlled such that the attenuated signals are effectively compensated. In the prior art, since the serial data comes in a variety of formats, a plurality of consecutive values 0 and a plurality of consecutive values 1 having different lengths in actual data correspond to different gains of the multi-stage equalizer, so that the current equalizer is not able to control the gain of the multi-stage equalizer in a reasonable way. Therefore, the proper way to control the gain of the equalizer is of great importance.

BRIEF SUMMARY

Given that the foregoing problems exist in the prior art, the present invention provides a method for controlling a gain of a multi-stage equalizer of a serial data receiver. According to the method, the optimized equalization identifiers of the set of serial data having various lengths, so that parameter adjustment is optimized, and the compatibility and the functional performance of the serial data receiver are improved.

The technical solution is as follows:
  a method for controlling a gain of a multi-stage equalizer of a serial data receiver, applied to the serial data receiver, the serial data receiver comprising the multi-stage equalizer, wherein the method comprises the steps of:
    Step S1, enabling the serial data receiver to receive a set of serial data;
    Step S2, selecting a plurality of continuous data sequences from the set of serial data according to a preset first rule;
    Step S3, extracting a predetermined bit from each of the plurality of continuous data sequences;
    Step S4, calculating an equalization gain identifier corresponding to each of the plurality of continuous data sequences according to a predetermined bit in each of the plurality of continuous data sequences;
    Step S5, obtaining an optimized equalization gain identifier through calculation according to each of the equalization gain identifiers; and
    Step S6, controlling a gain value of the multi-stage equalizer according to the optimized equalization gain identifier.

Preferably, in the above-mentioned method for controlling a gain of a multi-stage equalizer of a serial data receiver, wherein the preset first rule in Step S2 comprises:
    Step A1, setting a plurality of sequence length values for the set of serial data;
    Step A2, selecting a sequence length value from the plurality of sequence length values according to a preset second rule; and
    Step A3, selecting a current continuous data sequence from the serial data according to the selected sequence length value.

Preferably, in the above-mentioned method for controlling a gain of a multi-stage equalizer of a serial data receiver, wherein the data sequence has a length greater than or equal to 3 bits.

Preferably, in the above-mentioned method for controlling a gain of a multi-stage equalizer of a serial data receiver, wherein in Step S3, the predetermined bit is the third bit counting from the beginning of the data sequence, and a data interval between the first bit and the second bit counting from the beginning of the data sequences.

Preferably, in the above-mentioned method for controlling a gain of a multi-stage equalizer of a serial data receiver, wherein the data interval is obtained by sampling the set of serial data at half rate.

Preferably, in the above-mentioned method for controlling a gain of a multi-stage equalizer of a serial data receiver, wherein in Step S4, the equalization gain identifier is calculated by means of exclusive OR operation.

Preferably, in the above-mentioned method for controlling a gain of a multi-stage equalizer of a serial data receiver, wherein in Step S5, obtaining the optimized equalization gain identifier further comprises:
    Step S51, counting the number of the equalization gain identifiers which act as increase identifiers; and
    counting the number of the equalization gain identifiers which act as decrease identifiers;
    Step S52, determining whether the number of the equalization gain identifiers which act as increase identifiers is greater than the number of the equalization gain identifiers which act as decrease identifiers;
    if yes, the optimized equalization gain identifiers are the increase identifiers;
    if no, the optimized equalization gain identifiers are the decrease identifiers.

Preferably, in the above-mentioned method for controlling a gain of a multi-stage equalizer of a serial data receiver, wherein Step S6 further comprises:
    when the optimized equalization gain identifiers are the increase identifiers, decreasing of the gain value of the multi-stage equalizer; and
    when the optimized equalization gain identifiers are the decrease identifiers, increasing of the gain value of the multi-stage equalizer.

Preferably, in the above-mentioned method for controlling a gain of a multi-stage equalizer of a serial data receiver, wherein the preset second rule further comprises:
    Step B1, arranging each of the plurality of sequence length values according to the sequence length;

Step B2, sequentially selecting one of the sequence length values, and each selected sequence length value is not repeated; or randomly selecting one of the sequence length values, and each selected sequence length value is not repeated.

Preferably, in the above-mentioned method for controlling a gain of a multi-stage equalizer of a serial data receiver, wherein sequentially selecting one of the sequence length values comprises the steps of:

Step C1, counting the number of the sequence length values, and setting a corresponding serial number for each of the sequence length values according to a numerical value of each of the sequence length values;

Step C2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases}$$

wherein A represents the serial number of each currently selected sequence length value in the plurality of sequence length values, when A is not an integer, A is set to an integer closest to A and greater than A;

m represents a current round of selection; and n represents the number of the sequence length values.

By adopting the above-mentioned technical solutions, the present invention has the beneficial effects that by selecting a plurality of continuous data sequences from the set of serial data, and calculating the equalization gain identifier corresponding to each of the data sequences to obtain the optimized equalization gain identifier, and controlling a gain value of the multi-stage equalizer according to the optimized equalization gain identifier, so that the optimized equalization identifiers of the set of serial data having various lengths may be calculated, parameter adjustment is optimized, and the compatibility and the user performance of the serial data receiver are improved.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
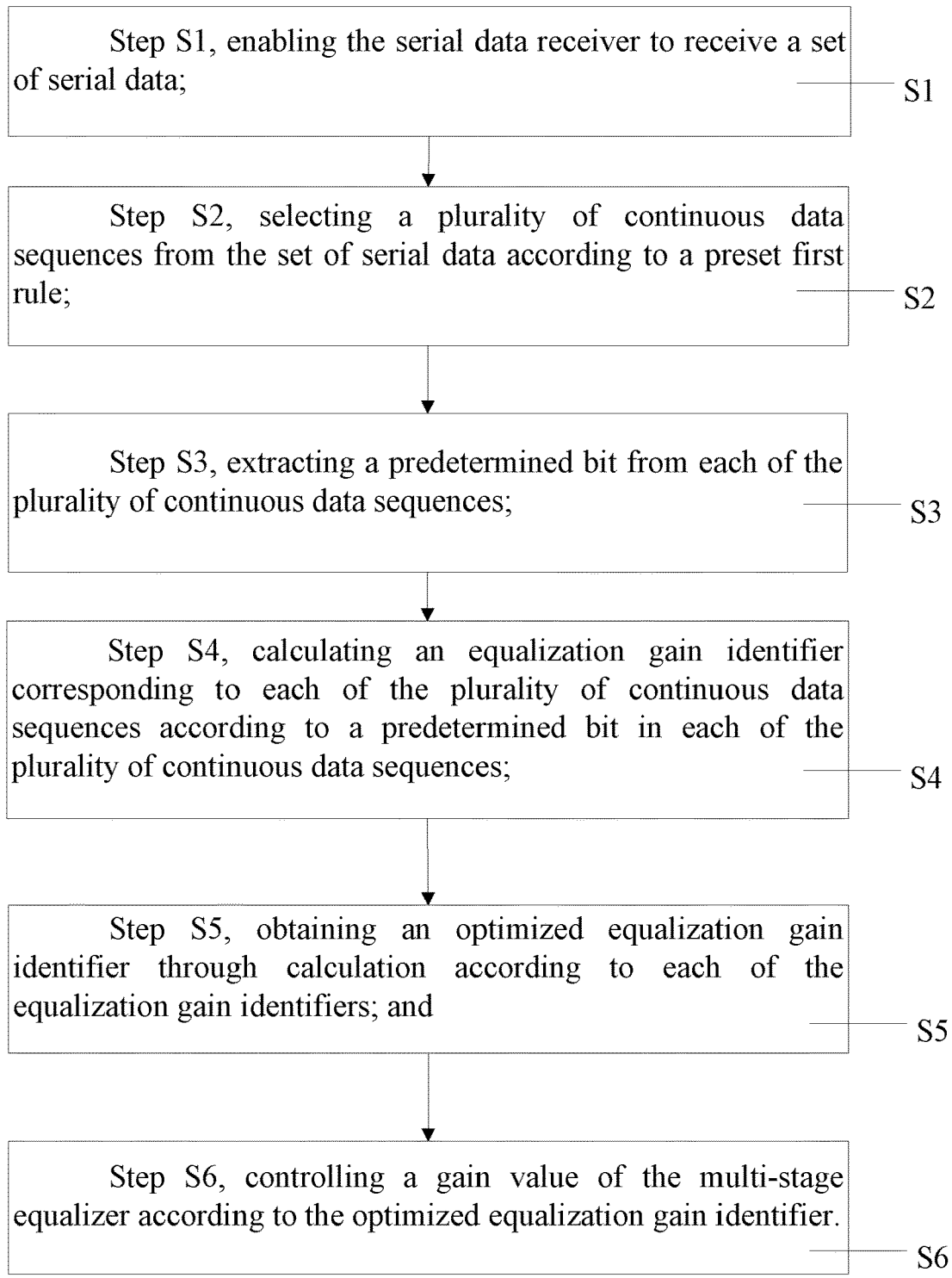
FIG. 1 is a flowchart illustrating a method for controlling a gain of a multi-stage equalizer of a serial data receiver according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The invention comprises a method for controlling a gain of a multi-stage equalizer of a serial data receiver, applied to the serial data receiver, the serial data receiver comprising the multi-stage equalizer, wherein as shown in FIG. 1, the method comprises the steps of:

Step S1, enabling the serial data receiver to receive a set of serial data;

Step S2, selecting a plurality of continuous data sequences from the set of serial data according to a preset first rule;

Step S3, extracting a predetermined bit from each of the plurality of continuous data sequences;

Step S4, calculating an equalization gain identifier corresponding to each of the plurality of continuous data sequences according to a predetermined bit in each of the plurality of continuous data sequences;

Step S5, obtaining an optimized equalization gain identifier through calculation according to each of the equalization gain identifiers; and Step S6, controlling a gain value of the multi-stage equalizer according to the optimized equalization gain identifier.

In the above-mentioned embodiment, by selecting a plurality of continuous data sequences from the set of serial data according to a preset first rule, and calculating the equalization gain identifiers corresponding to each of the data sequence, so as to obtain the optimized equalization gain identifier according to equalization gain identifiers, and controlling a gain value of the multi-stage equalizer according to the optimized equalization gain identifier, so that the optimized equalization identifiers of the set of serial data having various lengths may be calculated, parameter adjustment is optimized, and the compatibility and the user performance of the serial data receiver are improved.

Wherein, data in the continuous data sequences comprises a plurality of consecutive values 0 and a plurality of consecutive values 1.

Furthermore, as a preferred embodiment, the serial data receiver receives a set of serial data $D_{2m}$-$D_0$ (wherein, m is a natural number); then selecting a plurality of continuous data sequences from the set of serial data $D_{2m}$-$D_0$ according to a preset first rule, wherein the data sequence $D_6$-$D_0$ is any one of the continuous data sequence from the set of serial data $D_{2m}$-$D_0$;

the data sequence $D_6$-$D_0$ selected from the set of serial data $D_{2m}$-$D_0$ may be from the $7^{th}$ bit counting from the beginning of the set of serial data $D_{2m}$-$D_0$ to the 1st bit counting from the beginning of the set of serial data $D_{2m}$-$D_0$ (wherein, the data sequence $D_6$-$D_0$ is also from the $20^{th}$ bit counting from the beginning of the set of serial data $D_{2m}$-$D_0$ to the $14^{th}$ bit counting from the beginning of the set of serial data $D_{2m}$-$D_0$);

the data sequence $D_9$-$D_0$ selected from the set of serial data $D_{2m}$-$D_0$ may be from the $24^{th}$ bit counting from the beginning of the set of serial data $D_{2m}$-$D_0$ to the $13^{th}$ bit counting from the beginning of the set of serial data $D_{2m}$-$D_0$, the data sequence $D_{12}$-$D_0$ selected from the set of serial data $D_{2m}$-$D_0$ may be from the $22^{th}$ bit counting from the beginning of the set of serial data $D_{2m}$-$D_0$ to the $20^{th}$ bit counting from the beginning of the set of serial data $D_{2m}$-$D_0$;

the data sequence $D_{14}$-$D_0$ selected from the set of serial data $D_{2m}$-$D_0$ may be from the $29^{th}$ bit counting from the beginning of the set of serial data $D_{2m}$-$D_0$ to the $25^{th}$ bit counting from the beginning of the set of serial data $D_{2m}$-$D_0$;

then extracting predetermined bits from the above-mentioned data sequences, that is, the data sequence $D_6$-$D_0$, the data sequence $D_9$-$D_0$, the data sequence $D_{12}$-$D_0$, the data sequence $D_{14}$-$D_0$, to sequentially calculate an equalization gain identifier $T_1$ corresponding to the data sequence $D_6$-$D_0$, an equalization gain identifier $T_2$ corresponding to the data sequence $D_9$-$D_0$, an equalization gain identifier $T_3$ corresponding to the data sequence $D_{12}$-$D_0$, and an equalization gain identifier $T_4$ corresponding to the data sequence $D_{14}$-$D_0$; then obtaining an optimized equalization gain identifier $T_0$ through calculation according the equalization gain identifier $T_1$, the equalization gain identifier $T_2$, the equalization gain identifier $T_3$, and the equalization gain identifier $T_4$; finally, controlling a gain value of the multi-stage equalizer according to the optimized equalization gain identifier $T_0$, so that the optimized equalization identifiers of the set of serial data having various lengths may be calculated, so that parameter adjustment is optimized, and the compatibility and the user performance of the serial data receiver are improved.

Figure 2:
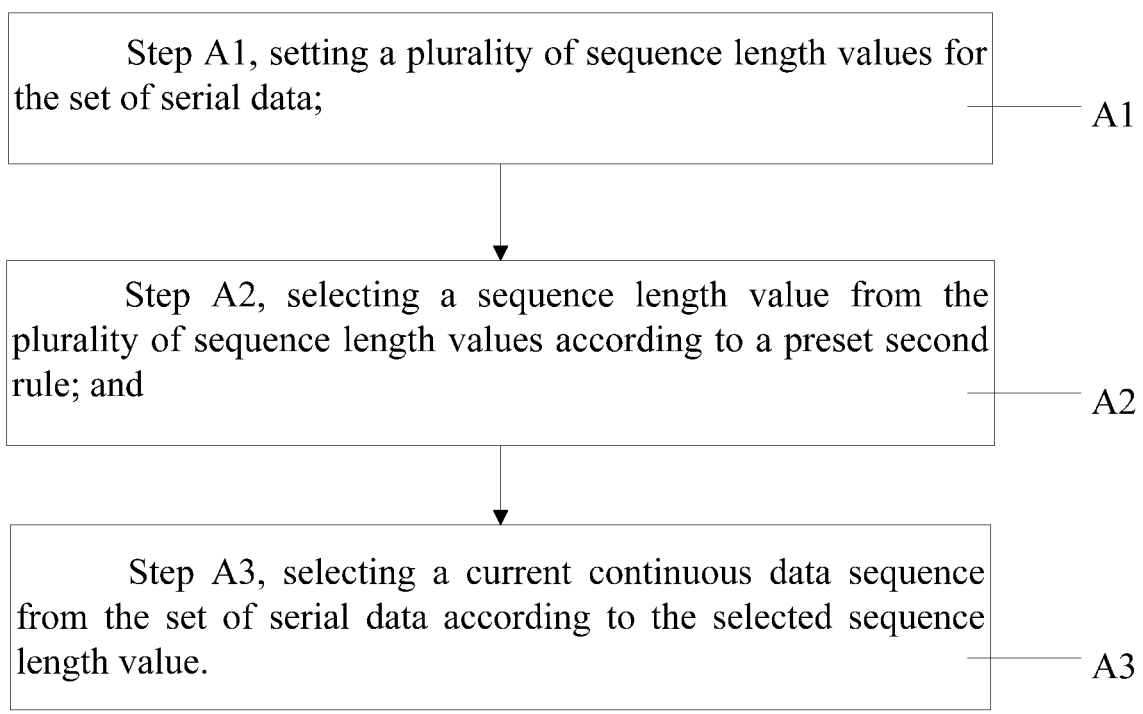
FIG. 2 is a flowchart illustrating a first rule of a method for controlling a gain of a multi-stage equalizer of a serial data receiver according to an embodiment of the present invention.

Furthermore, in the above-mentioned embodiment, as shown in FIG. 2, the preset first rule in Step S2 further comprises:

Step A1, setting a plurality of sequence length values for the set of serial data;

Step A2, selecting a sequence length value from the plurality of sequence length values according to a preset second rule; and Step A3, selecting a current continuous data sequence from the set of serial data according to the selected sequence length value.

Furthermore, as a preferred embodiment, the serial data receiver receives a set of serial data $D_{2m}$-$D_0$; then setting a plurality of sequence length values for the set of serial data $D_{2m}$-$D_0$, wherein the plurality of sequence length values comprise 7, 10, 13, and 15;

during the first round of selection, selecting the first sequence length value 7 from the plurality of sequence length values (7, 10, 13, and 15) according to the preset second rule; then selecting the current continuous data sequence $D_6$-$D_0$ from the set of serial data according to the selected sequence length value 7;

during the second round of selection, selecting the first sequence length value 10 from the plurality of sequence length values (7, 10, 13, and 15) according to the preset second rule; then selecting the current continuous data sequence $D_9$-$D_0$ from the set of serial data according to the selected sequence length value 10;

during the third round of selection, selecting the first sequence length value 13 from the plurality of sequence length values (7, 10, 13, and 15) according to the preset second rule; then selecting the current continuous data sequence $D_{12}$-$D_0$ from the set of serial data according to the selected sequence length value 13;

during the fourth round of selection, selecting the first sequence length value 15 from the plurality of sequence length values (7, 10, 13, and 15) according to the preset second rule; then selecting the current continuous data sequence $D_{14}$-$D_0$ from the set of serial data according to the selected sequence length value 15;

wherein, it should be noted that the number of the sequence length values may be set according to user requirements (in this embodiment, the number of the sequence length values is set to, but is not limited to 4);

the selected sequence length values may be set according to user requirements (in this embodiment, the sequence length values are 7, 10, 13, and 15, respectively, however, other values are also contemplated); and the selected number and the selection sequence may also be set according to user requirements (in this embodiment, the selected number is equal to or is not equal to the number of the sequence length values; and the selection sequence is not necessarily selected according to the numerical value of each of the sequence length values).

Furthermore, the length of the data sequence may be set according to user requirements. In a preferred embodiment, the data sequence has a length greater than or equal to 3 bits.

Furthermore, in the above-mentioned embodiment, in Step S3, the predetermined bit is the third bit counting from the beginning of the data sequence, and a data interval between the first bit and the second bit counting from the beginning of the data sequences.

In the above-mentioned embodiment, since the predetermined bit in Step S3 is the $3^{rd}$ bit counting from the beginning of the data sequences, and the predetermined bit in Step S3 is the data interval between the $1^{st}$ bit and the $2^{nd}$ bit counting from the beginning of the data sequences, the length of the data sequence is greater than or equal to 3 bits.

Furthermore, in the above-mentioned embodiment, the data interval is obtained by sampling the set of serial data at half rate.

Furthermore, as a preferred embodiment, the serial data receiver receives a set of serial data $D_{2m}$-$D_0$; a data interval $B_{2m-1}$-$B_0$ of the set of serial data $D_{2m}$-$D_0$ is obtained by sampling the set of serial data $D_{2m}$-$D_0$ at half rate, wherein, the data interval $B_0$ is a data interval between the $1^{st}$ bit $D_0$ and the $2^{nd}$ bit $D_1$ counting from the beginning of the data sequences $D_{2m}$-$D_0$, and the data interval $B_{2m-1}$ is a data interval between the last bit $D_{2m}$ and the penultimate bit $D_{2m-1}$ counting from the beginning of the data sequences $D_{2m}$-$D_0$.

Furthermore, in the above-mentioned embodiment, in Step S4, the equalization gain identifier is calculated by means of exclusive OR operation.

Furthermore, as a preferred embodiment, the serial data receiver receives a set of serial data $D_{2m}$-$D_0$ and obtains the first data sequence $D_6$-$D_0$, the second data sequence $D_9$-$D_0$, the third data sequence $D_{12}$-$D_0$, and the fourth data sequence $D_{14}$-$D_0$;

then continue to select:
the third bit $D_2$ counting from the beginning of the first data sequence $D_6$-$D_0$, and the data interval $B_0$ between the $1^{st}$ bit and the $2^{nd}$ bit counting from the beginning of the data sequence;
the third bit $D_2$ counting from the beginning of the second data sequence $D_9$-$D_0$, and the data interval $B_0$ between the $1^{st}$ bit and the $2^{nd}$ bit counting from the beginning of the data sequence;
the third bit $D_2$ counting from the beginning of the third data sequence $D_{12}$-$D_0$, and the data interval $B_0$ between the 1st bit and the $2^{nd}$ bit counting from the beginning of the data sequence;
the third bit $D_2$ counting from the beginning of the fourth data sequence $D_{14}$-$D_0$, and the data interval $B_0$ between the $1^{st}$ bit and the $2^{nd}$ bit counting from the beginning of the data sequence;
then calculating an equalization gain identifier corresponding to each of the plurality of data sequences, as shown in Table 1:

TABLE 1

|  | $D_n$ | $\cdots$ | $D_4$ | $D_3$ | $D_2$ | $D_1$ | $D_0$ | $B_0$ | Equalization gain identifier |
|---|---|---|---|---|---|---|---|---|---|
| First data sequence $D_6$-$D_0$ | 0 | 0 | 0 | 0 | 0 | 0 | 1 | 1 | 1 |
| Second data sequence $D_9$-$D_0$ | 0 | 0 | 0 | 0 | 0 | 1 | 0 | 1 | 1 |
| Third data sequence $D_{12}$-$D_0$ | 1 | 1 | 1 | 1 | 1 | 1 | 0 | 0 | 1 |
| Fourth data sequence $D_{14}$-$D_0$ | 1 | 1 | 1 | 1 | 1 | 0 | 1 | 1 | −1 |

It can be known from table 1 that when the third bit $D_2$ counting from the beginning of the first data sequence $D_6$-$D_0$ is 0, and the data interval $B_0$ between the $1^{st}$ bit and the $2^{nd}$ bit counting from the beginning of the data sequence is 1, the equalization gain identifier is 1;

when the third bit $D_2$ counting from the beginning of the second data sequence $D_9$-$D_0$ is 0, and the data interval $B_0$ between the $1^{st}$ bit and the $2^{nd}$ bit counting from the beginning of the data sequence is 1, the equalization gain identifier is 1;

when the third bit $D_2$ counting from the beginning of the third data sequence $D_{12}$-$D_0$ is 1, and the data interval $B_0$ between the $1^{st}$ bit and the $2^{nd}$ bit counting from the beginning of the data sequence is 0, the equalization gain identifier is 1;

when the third bit $D_2$ counting from the beginning of the fourth data sequence $D_{14}$-$D_0$ is 1, and the data interval $B_0$ between the 1st bit and the $2^{nd}$ bit counting from the beginning of the data sequence is 1, the equalization gain identifier is −1;

that is, when the third bit $D_2$ counting from the beginning of the data sequence is equal to the data interval $B_0$ between the $1^{st}$ bit and the $2^{nd}$ bit counting from the beginning of the data sequence, the obtained equalization gain identifier is −1;

when the third bit $D_2$ counting from the beginning of the data sequence is not equal to the data interval $B_0$ between the $1^{st}$ bit and the $2^{nd}$ bit counting from the beginning of the data sequence, the obtained equalization gain identifier is 1.

Wherein, the value "1" or "−1" in the equalization gain identifier 1 or −1 does not represent concrete data, but represents an identifier, and other identifiers may be used to represent the equalization gain identifier.

$B_0$ of each data sequence in Table 1 maybe 0 or 1, and data of each data sequence has eight possibilities. For example, data of the data sequence $D_6$-$D_0$ may have eight possibilities, as shown in Table 2 below:

TABLE 2

|  | $D_6$ | $D_5$ | $D_4$ | $D_3$ | $D_2$ | $D_1$ | $D_0$ | $B_0$ | Equalization gain identifier |
|---|---|---|---|---|---|---|---|---|---|
| Possibility 1 of data sequence $D_6$-$D_0$ | 0 | 0 | 0 | 0 | 0 | 0 | 1 | 0 | −1 |
|  |  |  |  |  |  |  |  | 1 | 1 |
| Possibility 2 of data sequence $D_6$-$D_0$ | 0 | 0 | 0 | 0 | 0 | 1 | 0 | 0 | −1 |
|  |  |  |  |  |  |  |  | 1 | 1 |
| Possibility 3 of data sequence $D_6$-$D_0$ | 1 | 1 | 1 | 1 | 1 | 1 | 0 | 0 | 1 |
|  |  |  |  |  |  |  |  | 1 | −1 |
| Possibility 4 of data sequence $D_6$-$D_0$ | 1 | 1 | 1 | 1 | 1 | 0 | 1 | 0 | 1 |
|  |  |  |  |  |  |  |  | 1 | −1 |

It can be known from Table 2 that data $D_6$-$D_2$ of the data sequence $D_6$-$D_0$ is continuous 0 or 1, wherein $B_0$ maybe 0 or 1, therefore, the equalization gain identifier is also varied with $D_2$ and $B_0$.

Figure 3:
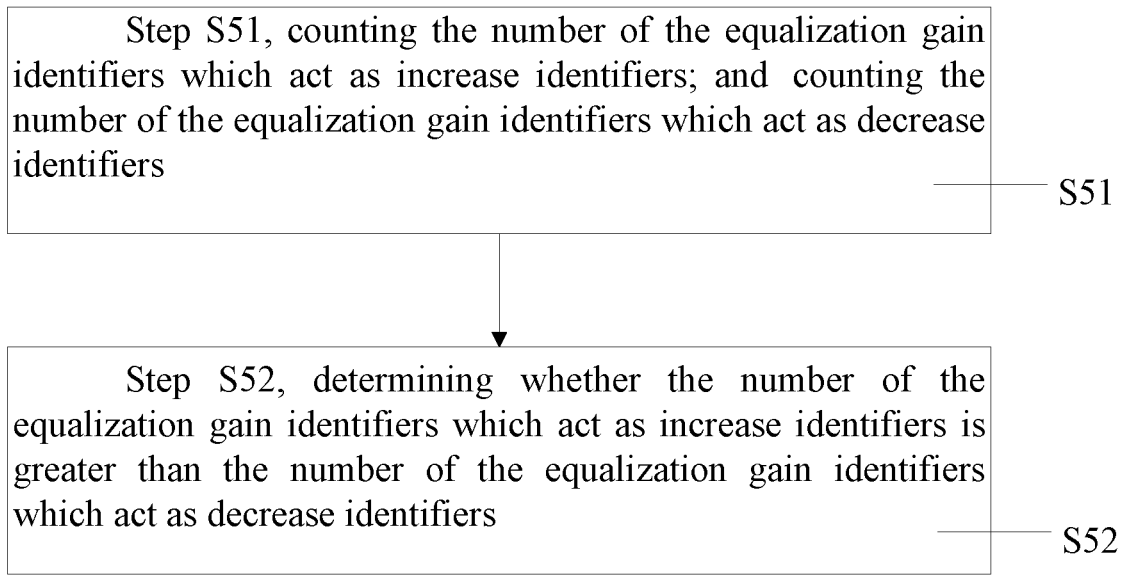
FIG. 3 is a flowchart illustrating Step S5 of a method for controlling a gain of a multi-stage equalizer of a serial data receiver according to an embodiment of the present invention.

Furthermore, in the above-mentioned embodiment, as shown in FIG. 3, in Step S5, obtaining the optimized equalization gain identifier further comprises:

Step S51, counting the number of the equalization gain identifiers which act as increase identifiers; and
counting the number of the equalization gain identifiers which act as decrease identifiers;

Step S52, determining whether the number of the equalization gain identifiers which act as increase identifiers is greater than the number of the equalization gain identifiers which act as decrease identifiers;
if yes, the optimized equalization gain identifiers are the increase identifiers;
if no, the optimized equalization gain identifiers are the decrease identifiers.

Wherein, as a preferred embodiment, when the equalization gain identifier is 1, the equalization gain identifier may be set as the increase identifier; when the equalization gain identifier is −1, the equalization gain identifier may be set as the decrease identifier.

Furthermore, in the above-mentioned embodiment, the equalization gain identifier of the first data sequence $D_6$-$D_0$ is 1, the equalization gain identifier of the second data sequence $D_9$-$D_0$ is 1, the equalization gain identifier of the third data sequence $D_{12}$-$D_0$ is 1, and equalization gain identifier of the fourth data sequence $D_{14}$-$D_0$ is −1; that is, when the number of the equalization gain identifiers which act as increase identifiers is greater than the number of the equalization gain identifiers which act as decrease identifiers, the optimized equalization gain identifiers are the increase identifiers, that is, the optimized equalization gain identifiers are 1.

Furthermore, in the above-mentioned embodiment, Step S6 further comprises:
   when the optimized equalization gain identifiers are the increase identifiers, decreasing of the gain value of the multi-stage equalizer; and
   when the optimized equalization gain identifiers are the decrease identifiers, increasing of the gain value of the multi-stage equalizer.

Figure 4:
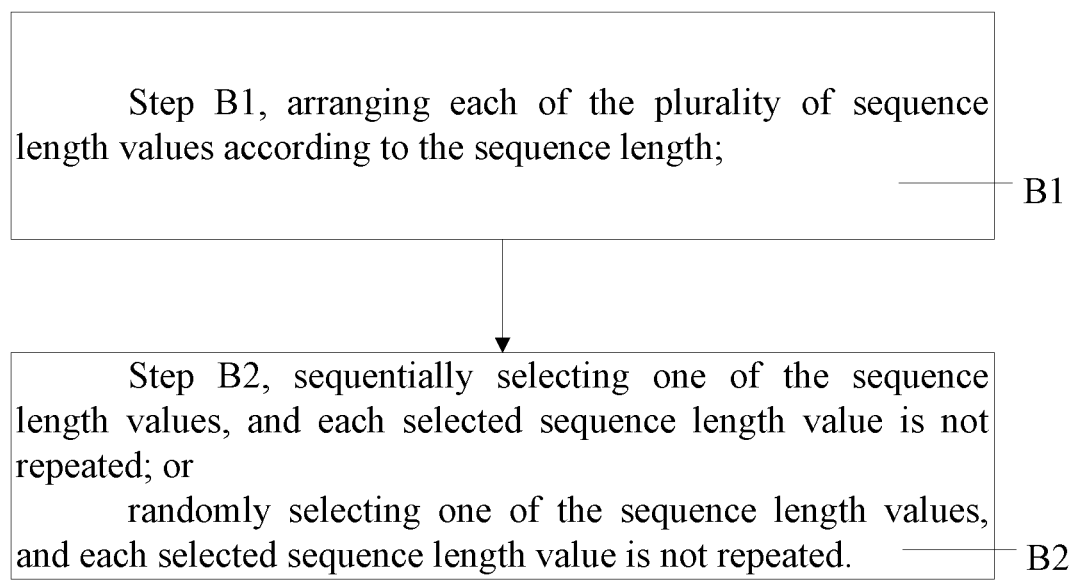
FIG. 4 is a flowchart illustrating a second rule of a method for controlling a gain of a multi-stage equalizer of a serial data receiver according to an embodiment of the present invention.

Furthermore, in the above-mentioned embodiment, as shown in FIG. 4, the preset second rule further comprises:
   Step B1, arranging each of the plurality of sequence length values according to the sequence length;
   Step B2, sequentially selecting one of the sequence length values, and each selected sequence length value is not repeated; or
   randomly selecting one of the sequence length values, and each selected sequence length value is not repeated.

Furthermore, in the above-mentioned embodiment, sequentially selecting one of the sequence length values comprises the steps of:
   Step C1, counting the number of the sequence length values, and
   setting a corresponding serial number for each of the sequence length values according to a numerical value of each of the sequence length values;
   Step C2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases}$$

wherein A represents the serial number of each currently selected sequence length value in the plurality of sequence length values, when A is not an integer, A is set to an integer closest to A and greater than A;
m represents a current round of selection; and
n represents the number of the sequence length values.

Furthermore, as a preferred embodiment, the serial data receiver receives a set of serial data $D_{2m}$-$D_0$; setting a plurality of sequence length values for the set of serial data $D_{2m}$-$D_0$, wherein the plurality of sequence length values comprise 3, 7, 10, 13, 15, 18, 20, 26, 36, 42, 45, 49; setting a corresponding serial number for each of the sequence length values according to a numerical value of each of the sequence length values, that is, setting a serial number of 1 for the sequence length value 3, setting a serial number of 2 for the sequence length value 7, and setting a serial number of 3 for the sequence length value 13, and so on, and setting a serial number of 12 for the sequence length value 49;
   during the first round of selection, the sequence length value with a serial number 1 is selected, and the current continuous data sequence is selected from the set of serial data with the extracted sequence length value of 3;
   during the second round of selection, the sequence length value with a serial number 6 is selected, and the current continuous data sequence is selected from the set of serial data with the extracted sequence length value of 18;
   during the third round of selection, A is calculated to be equal to 10.5. Since A is not an integer, A is set to an integer closest to A and greater than A, that is A is set to 11;
   the sequence length value with a serial number 11 is selected, and the current continuous data sequence is selected from the set of serial data with the extracted sequence length value of 45;
   during the fourth round of selection, A is calculated to be equal to 11.25. Since A is not an integer, A is set to an integer closest to A and greater than A, that is A is set to 12; and
   the sequence length value with a serial number 12 is selected, and the current continuous data sequence is selected from the set of serial data with the extracted sequence length value of 49;

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for controlling a gain of a multi-stage equalizer of a serial data receiver, applied to the serial data receiver, the serial data receiver comprising the multi-stage equalizer, wherein the method comprises the steps of:
   Step S1, enabling the serial data receiver to receive a set of serial data;
   Step S2, selecting a plurality of continuous data sequences from the set of serial data according to a preset first rule;
   Step S3, extracting a predetermined bit from each of the plurality of continuous data sequences;
   Step S4, calculating an equalization gain identifier corresponding to each of the plurality of continuous data sequences according to a predetermined bit in each of the plurality of continuous data sequences;
   Step S5, obtaining an optimized equalization gain identifier through calculation according to each of the equalization gain identifiers; and
   Step S6, controlling a gain value of the multi-stage equalizer according to the optimized equalization gain identifier;
   wherein in Step S5, obtaining the optimized equalization gain identifier further comprises:
   Step S51, counting the number of the equalization gain identifiers which act as increase identifiers; and
   counting the number of the equalization gain identifiers which act as decrease identifiers;
   Step S52, determining whether the number of the equalization gain identifiers which act as increase identifiers is greater than the number of the equalization gain identifiers which act as decrease identifiers;
   if yes, the optimized equalization gain identifiers are the increase identifiers; and
   if no, the optimized equalization gain identifiers are the decrease identifiers.

2. The method for controlling a gain of a multi-stage equalizer of a serial data receiver of claim 1, wherein the preset first rule in Step S2 comprises:
   Step A1, setting a plurality of sequence length values for the set of serial data;
   Step A2, selecting a sequence length value from the plurality of sequence length values according to a preset second rule; and Step A3, selecting a current continuous data sequence from the set of serial data according to the selected sequence length value.

3. The method for controlling a gain of a multi-stage equalizer of a serial data receiver of claim 1, wherein the data sequence has a length greater than or equal to 3 bits.

4. The method for controlling a gain of a multi-stage equalizer of a serial data receiver of claim 3, wherein in Step S3, the predetermined bit is a third bit counting from the beginning of the data sequence, and a data interval between a first bit and a second bit counting from the beginning of the data sequences.

5. The method for controlling a gain of a multi-stage equalizer of a serial data receiver of claim 4, wherein the data interval is obtained by sampling the set of serial data at half rate.

6. The method for controlling a gain of a multi-stage equalizer of a serial data receiver of claim 4, wherein in Step S4, the equalization gain identifier is calculated by means of exclusive OR operation.

7. The method for controlling a gain of a multi-stage equalizer of a serial data receiver of claim 1, wherein Step S6 further comprises:
  when the optimized equalization gain identifiers are the increase identifiers, decreasing the gain value of the multi-stage equalizer; and
  when the optimized equalization gain identifiers are the decrease identifiers, increasing the gain value of the multi-stage equalizer.

8. The method for controlling a gain of a multi-stage equalizer of a serial data receiver of claim 2, wherein the preset second rule further comprises:

Step B1, arranging each of the plurality of sequence length values according to the sequence length;

Step B2, sequentially selecting one of the sequence length values, and each selected sequence length value is not repeated; or randomly selecting one of the sequence length values, and each selected sequence length value is not repeated.

9. The method for controlling a gain of a multi-stage equalizer of a serial data receiver of claim 8, wherein sequentially selecting one of the sequence length values comprises the steps of:

Step C1, counting the number of the sequence length values, and setting a corresponding serial number for each of the sequence length values according to a numerical value of each of the sequence length values;

Step C2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases};$$

wherein A represents the serial number of each currently selected sequence length value in the plurality of sequence length values, when A is not an integer, A is set to an integer closest to A and greater than A;

m represents a current round of selection; and n represents the number of the sequence length values.

* * * * *